US010769334B2

(12) United States Patent
Hickerson et al.

(10) Patent No.: US 10,769,334 B2
(45) Date of Patent: Sep. 8, 2020

(54) INTELLIGENT FAIL RECOGNITION (71) Applicant: International Business Machines Corporation, Armonk, NY (US)

(72) Inventors: Bryan G. Hickerson, Cedar Park, TX (US); Mohamed Baker Alawieh, Austin, TX (US); Brian L. Kozitza, Georgetown, TX (US); John R. Reysa, Austin, TX (US); Erica Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 16/193,598

(22) Filed: Nov. 16, 2018

(65) Prior Publication Data
US 2020/0159872 A1 May 21, 2020

(51) Int. Cl.
*G06F 30/3323* (2020.01)
*G06F 30/20* (2020.01)
*G06F 30/30* (2020.01)
*G06N 20/00* (2019.01)

(52) U.S. Cl.
CPC .......... *G06F 30/3323* (2020.01); *G06F 30/20* (2020.01); *G06F 30/30* (2020.01); *G06N 20/00* (2019.01)

(58) Field of Classification Search
USPC .......................................................... 716/106
See application file for complete search history.

(56) References Cited

U.S. PATENT DOCUMENTS

| 8,078,556 | B2 | 12/2011 | Adi et al. | |
|---|---|---|---|---|
| 8,140,514 | B2 | 3/2012 | Nguyen et al. | |
| 2005/0268256 | A1* | 12/2005 | Tsai | G03F 1/36 716/52 |
| 2011/0209106 | A1* | 8/2011 | Cheng | G03F 1/38 716/55 |
| 2017/0083827 | A1* | 3/2017 | Robatmili | G06N 20/00 |
| 2017/0199803 | A1* | 7/2017 | Bagal | G06F 11/362 |
| 2019/0227902 | A1* | 7/2019 | Cheng | G06F 8/71 |

* cited by examiner

*Primary Examiner* — Mohammed Alam
(74) *Attorney, Agent, or Firm* — Scully, Scott, Murphy & Presser, P.C.

(57) ABSTRACT

A method, computer program product, and a fail recognition apparatus are disclosed for debugging one or more simulation fails in processor design verification that in one or more embodiments includes determining whether a prediction model exists; retrieving, in response to determining the prediction model exists, the prediction model; predicting one or more bug labels using the prediction model; determining whether a fix is available for the one or more predicted bug labels; and simulating, in response to determining the fix is available for the one or more predicted bug labels, the fix for the one or more predicted bug labels.

20 Claims, 3 Drawing Sheets

INTELLIGENT FAIL RECOGNITION

BACKGROUND

Current microprocessor design verification environments rely on design verification engineers to triage and debug simulation failures. Triaging and debugging simulation failures are most often a tedious and time consuming task that requires a significant investment in human resources. The human resource investment is also typically the most expensive portion in verifying the design of a microprocessor. Moreover, to find a real design bug, design verification engineers may have to triage and debug thousands of simulation fails, which is time consuming and requires the engineers to manually process each simulation fail.

Conventional methods of categorizing simulation failures into known and unknown domains utilize either a manual approach or a scripts approach that are based on a human produced set of rules. The manual approach is time consuming and error prone. The scripting approach is usually constrained to a few simulation failing scenarios and requires an exact sequence of events leading up to the failure point to properly debug/categorize the failure. Oftentimes, the rules for both approaches are incorrectly written resulting in an overly broad grouping of failures and significantly slowing down the design verification process. Moreover, these approaches lack rules for identifying a potential simulation failure that results in an already categorized failing scenario signature but has a different root problem than the categorized failing scenario signature. The problems arising from the manual approach and the scripts approach can result in both design bugs making it into a developed microprocessor as well as introducing delays in the design bug discovery stage.

SUMMARY

The disclosure herein relates generally to machine learning, and more particularly, to methods, apparatus, and products for an intelligent fail recognition system for identifying design bugs in one or more simulation fails for a processor design.

The summary of the disclosure is given to aid understanding of an intelligent fail recognition system utilizing machine learning in processor design verification, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the data processing system, the fail recognition system, and their method of operation to achieve different effects.

According to one or more embodiments of the present disclosure, a method of debugging one or more simulation fails in processor design verification includes determining whether a prediction model exists. In one or more embodiments, the method includes retrieving, in response to determining the prediction model exists, the prediction model. In one or more embodiments, the method includes predicting one or more bug labels using the prediction model. In one or more embodiments, the method includes determining whether a fix is available for the one or more predicted bug labels. In some embodiments, the method includes simulating, in response to determining the fix is available for the one or more predicted bug labels, the fix for the one or more predicted bug labels.

According to one or more embodiments of the present disclosure, a computer program product includes a non-transitory computer-readable storage medium having program instructions embodied therewith for debugging one or more simulation fails in processor design verification, the program instructions executable by one or more processors. The program instructions in an embodiment includes determining whether a prediction model exists. The program instructions include retrieving, in response to determining the prediction model exists, the prediction model. The program instructions in an embodiment include predicting one or more bug labels using the prediction model. The program instructions in an embodiment include determining whether a fix is available for the one or more predicted bug labels. The program instructions in an embodiment include simulating, in response to determining the fix is available for the one or more predicted bug labels, the fix for the one or more predicted bug labels.

According to one or more embodiments of the present disclosure, a fail recognition apparatus for debugging one or more simulation fails in processor design verification including memory having program instructions embodied therewith, and at least one processor. In one or more embodiments, the at least one processor is configured to read the program instructions to execute a simulation environment configured to determine whether a prediction model exists. In one or more embodiments, the at least one processor is configured to read the program instructions to execute a model predictor configured to, in response to determining the prediction model exists, retrieve the prediction model and predict one or more bug labels using the prediction model. In one or more embodiments, the at least one processor is configured to read the program instructions to execute a feedback unit configured to determine whether a fix is available for the one or more predicted bug labels, and simulate, in response to determining the fix is available for the one or more predicted bug labels, the fix for the one or more predicted bug labels.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the data processing system, the fail recognition system, and their method of operation will be better understood when read in conjunction with the figures provided. Embodiments are provided in the figures for the purpose of illustrating aspects, features, and/or various embodiments of the data processing system, the fail recognition system, and their method of operation, but the claims should not be limited to the precise arrangement, structures, features, aspects, assemblies, systems, embodiments, or devices shown, and the arrangements, structures, subassemblies, features, aspects, methods, processes, embodiments, and devices shown may be used singularly or in combination with other arrangements, structures, assemblies, subassemblies, systems, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the data processing system, the fail recognition system, and their method of operation, however, it will be understood by those skilled in the art that different and numerous embodiments of the data processing system, the fail recognition system, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors and microprocessor systems and architectures, which are apparent to those skilled in the art. It is assumed that those skilled in the art are familiar with the general architecture of processors, and in particular with processors which operate in an out-of-order execution fashion. It may be noted that a numbered element is numbered according to the figure in which the element is introduced, and is typically referred to by that number throughout succeeding figures.

Exemplary methods, apparatus, and products for machine learning, and in particular, for an intelligent fail recognition system for triaging and debugging simulation fails in processor design verification in accordance with the present disclosure are described further below with reference to the Figures.

Figure 1:
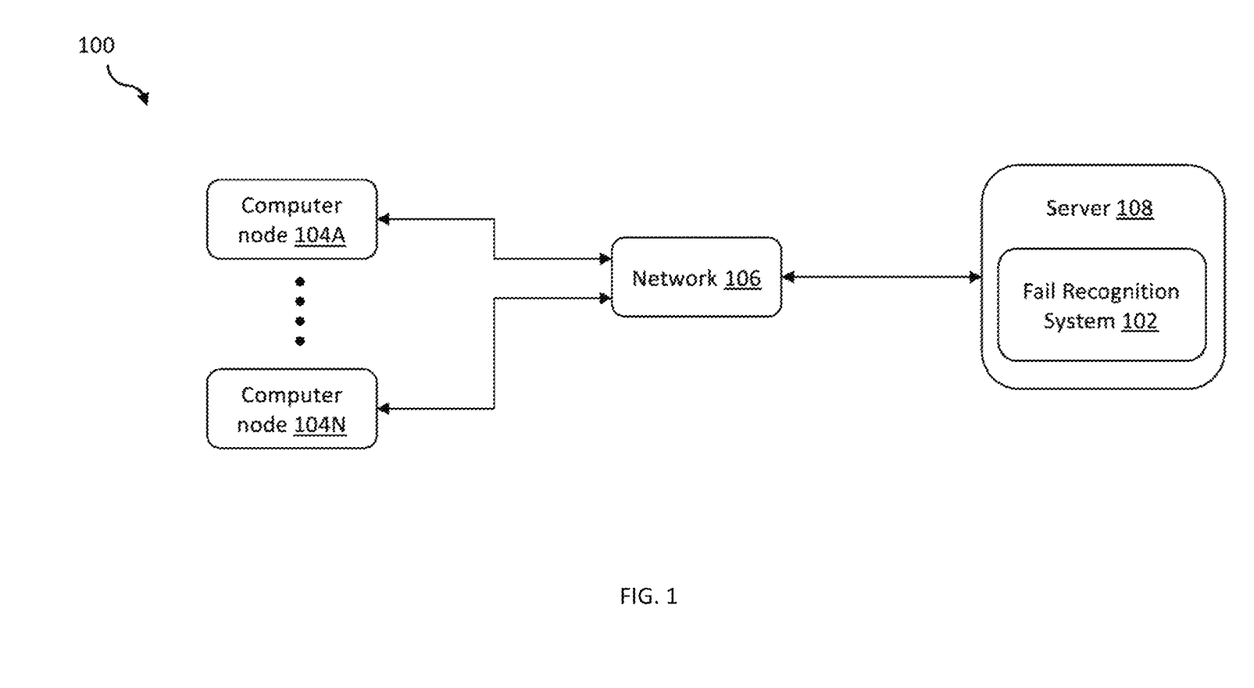
FIG. 1 is a functional block diagram illustrating a data processing environment, according to one or more embodiments of the present disclosure.

FIG. 1 is a functional block diagram illustrating a data processing environment 100, in accordance with one or more embodiments of the present disclosure. FIG. 1 provides only an illustration of one implementation and does not imply any limitations with regard to the environments in which different embodiments may be implemented. Many modifications to the depicted environment may be made by those skilled in the art without departing from the scope of the embodiments herein. Data processing environment 100 includes network 106, server 108, which operates the fail recognition system 102, and one or more computer nodes, such as computer node 104A and computer node 104N.

Network 106 can be, for example, a local area network (LAN), a telecommunications network, a wide area network (WAN), such as the Internet, a virtual local area network (VLAN), or any combination that can include wired, wireless, or fiber optic connections. Network 106 can also include wire cables, wireless communication links, fiber optic cables, routers, switches and/or firewalls. Network 106 interconnects server 108, computer node 104A, and computer node 104N. In general, network 106 can be any combination of connections and protocols capable of supporting communications between server 108, computer node 104A, computer node 104N, and fail recognition system 102.

Server 108 can be a web-based server hosting fail recognition system 102, in accordance with embodiments of the disclosure. In one or more embodiments, server 108 can be a web server, a blade server, a computer including one or more processors and at least one non-transitory computer readable memory, a mobile computing device, a laptop computer, a tablet computer, a netbook computer, a personal computer (PC), a desktop computer, or any programmable electronic device or computing system capable of receiving and sending data, via network 106, and performing computer-readable program instructions. In other embodiments, server 108 can be a data center, consisting of a collection of networks and servers providing an IT service, such as virtual servers and applications deployed on virtual servers, to an external party. In yet other embodiments, server 108 represents a computing system utilizing clustered computers and components (e.g., database server computer, application server computers, etc.) that act as a single pool of seamless resources, such as in a cloud computing environment, when accessed within data processing environment 100.

In some embodiments, server 108 includes a data storage repository (not shown) for storing data including, but not limited to, training data, simulation output files, sample of debugged and labeled bug instances, and/or prediction models. Data storage repository can be one of, a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with server 108, computer node 104A, and computer node 104N, via network 106. In other embodiments, data storage repository can represent virtual instances operating on a computing system utilizing clustered computers and components (e.g., database server computer, application server computers, etc.) that act as a single pool of seamless resources when accessed within data processing environment 100.

In some embodiments, fail recognition system 102 operates on a central server, such as server 108, and can be utilized by one or more computer nodes, such as computer node 104A and computer node 104N, via a mobile application downloaded from the central server or a third-party application store. In another embodiment, fail recognition system 102 may be a software-based program, downloaded from a central server, such as server 108, and installed on one or more computer nodes, such as computer node 104A and computer node 104N. In yet another embodiment, fail recognition system 102 can be utilized as a software service provided by a third-party cloud service provider (not shown).

In some embodiments, computer node 104A and computer node 104N are clients to server 108 and can be, for example, a desktop computer, a laptop computer, a tablet computer, a personal digital assistant (PDA), a smart phone, a thin client, or any other electronic device or computing system capable of communicating with server 108 through network 106. For example, computer node 104A and computer node 104N may be a desktop computer capable of connecting to a network, such as network 106, to access one or more components of the fail recognition system 102. In other embodiments, computer node 104A and computer node 104N can be any suitable types of mobile devices capable of running mobile applications, including smart phones, tablets, slate, or any type of device that runs a mobile operating system. In yet other embodiments, computer node 104A and computer node 104N can represent virtual instances operating on a computing system utilizing clustered computers and components (e.g., database server computer, application server computers, etc.) that act as a single pool of seamless resources when accessed within data processing environment 100. In yet another embodiment, computer node 104A and computer node 104N can include a user interface (not shown) for providing an end user with the capability to interact with fail recognition system 102.

In some embodiments, computer node 104A and 104N are capable of communicating with each other, with server 108, and with other computer nodes in a distributed cluster through network 106. In some embodiments, the computer nodes and server 108 can function as one or more clusters in a distributed system, via network 106, to operate fail recognition system 102. In some embodiments, components of fail recognition system 102 reside locally on server 108. In other embodiments, components of fail recognition system 102, either individually or in various combinations, reside remotely from each other on server 108 and one or more computer nodes, such as computer node 104A and 104N, of the distributed clusters, in which the components are connected via network 106. In an embodiment, network 106 connects the one or more computer nodes of the distributed clusters.

Figure 2:
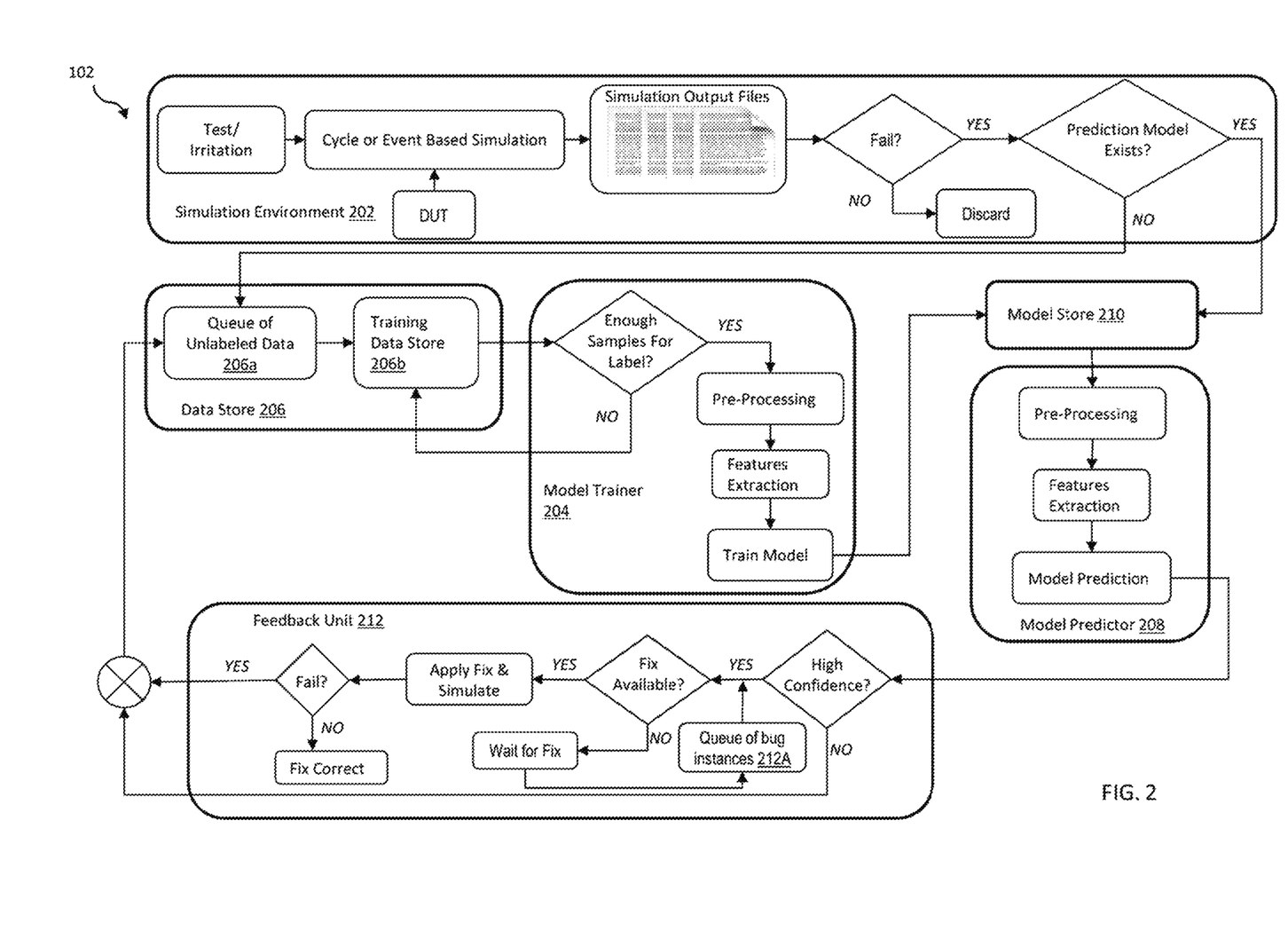
FIG. 2 is a functional block diagram illustrating components of a fail recognition system, according to one or more embodiments of the present disclosure.

FIG. 2 is a functional block diagram illustrating components of a fail recognition system 102, according to one or more embodiments of the present disclosure. In some embodiments, fail recognition system 102 includes one or more components, such as, a simulation environment 202, a model store 210, a model trainer 204, data store 206 including a queue of unlabeled data 206a and a training data store 206b, a model predictor 208, and/or a feedback unit 212.

In some embodiments, the simulation environment 202 is configured to simulate a design under test (DUT) using various tests or irritation scenarios. The simulation environment 202 is configured to generate one or more simulation output files based on the simulated DUT. In one or more aspects, a simulation output file may be a design bug artifact file. The simulation output files can include unconstrained raw data that may be composed of HDL signals, HDL coverage events for verification purposes, programming language events (C++, python, etc.), or analysis tool output (gate utilization analysis tools for power, performance analysis tools, etc.). For the cases in which a failure, that is, a bug instance, in the one or more simulation output files is not detected, the simulation environment 202 discards the one or more simulation output files. For the cases in which a failure is detected, the simulation environment 202 determines whether a prediction model exists.

For the cases in which the simulation environment 202 determines that a prediction model does not exist, the one or more bug instances of the one or more simulation output files are debugged and the type of bug for the bug instance is labeled. In one or more embodiments, one or more bug instances are retrieved, for example, by a design verification engineer, from a queue of unlabeled data 206a upon which the engineer may debug and label the one or more bug instances, and provide these initial samples to the training data store 206b. For example, a bug instance may be retrieved, for example, by an engineer, from a queue of unlabeled data 206a, debugged, and associated with an existing label or a new label can be created for the bug instance. The label for the bug instance may indicate a bug type. In one or more embodiments, after the bug instance is associated with an existing label or a new label is created, the labeled bug is grouped with bugs having the same and/or similar bug label. In some embodiments, the training data store 206b is a storage repository, such as the data storage repository of server 108. In yet other embodiments, the training data store 206b and the model store 210 are the same storage repository. In other embodiments, the initial samples are provided directly to the model trainer 204. The model trainer 204 retrieves the initial group of samples from the training data store 206b.

In one or more embodiments, the model trainer 204 determines whether there are enough samples to train a new prediction model. The model trainer 204 may use the one or more samples to train the prediction model if the number of samples is greater than or equal to a threshold number. For the cases in which the number of samples does not meet or exceed the threshold number, the model trainer 204 does not utilize the group of samples to train the prediction model. The model trainer 204 stores the samples into the training data store 206b to be used as training data. In one or more embodiments, the training data is used to retrain or update an existing prediction model. For the cases in which the number of samples meets or exceeds the threshold number, the model trainer 204 prepares the samples to train or build a new prediction model.

In some embodiments the one or more simulation output files are provided as a text document. A set of features may be defined to represent each file as a vector of numerical values that can be used to train the predictive model. In some embodiments, a regular expression of a simulation output file defines a token (for example, a word, a group of words, phrases, topics, etc.). In one or more embodiments, the model trainer 204 pre-processes the one or more simulation output files to reduce the data set size. The model trainer 204 may pre-process the simulation output files by extracting relevant data that is used to extract tokens present in one or more files in the data set. The model trainer 204 may select the relevant data by selecting the information around and related to the bug instance in the simulation output file. The model trainer 204 may crop out data that is generic and/or unrelated to the bug instance in the file and/or outside a temporal window of influence. In other embodiments, the model trainer 204 does not pre-process the one or more simulation output files, and extracts the one or more tokens present in all files in the data set.

In one or more embodiments, the model trainer 204 extracts one or more tokens present in the one or more pre-processed files in the data set. In other embodiments, the model trainer 204 extracts the one or more tokens present in the one or more files in the data set that were not pre-processed. The model trainer 204 may compute the frequency of occurrence of each token in each file. The frequency may represent the score of the token in each file. In some embodiments, using a number (N) of simulation output files, the model trainer 204 obtains a D×N matrix containing the scores of all D tokens in all documents.

The obtained scores matrix may contain tokens with different score ranges, which may result in the predictive model giving more weight to the tokens with higher values. In some embodiments, to avoid the unwanted weighting, the model trainer 204 may adopt a smart weighting scheme such that tokens that are common in most of the files are given less weight compared to those present in a small subset of the files. By normalizing the tokens, the model trainer 204 may search for distinguishing tokens to build a prediction model. The distinguishing tokens may be unique per group and not present across all files. In other embodiments, the model trainer 204 may not use the smart weighting scheme when building certain prediction models.

In an embodiment, with the normalized matrix of scores, the model trainer 204 trains the new prediction model. In one or more embodiments, the prediction model is a classifier having a categorical output that represents a bug label. The model trainer 204 may store the trained prediction model in a model store 210. In some embodiments, the model store 210 is a storage repository, such as the data storage repository of server 108. In some embodiments, the trained prediction model is used to predict a bug label of a bug instance generated by a DUT and to provide the confidence level associated with the prediction of the bug label.

In one or more embodiments, the simulation environment 202 receives another request to generate one or more simulation output files. In some embodiments, the simulation environment 202 simulates another DUT, which may be the same as the previously tested DUT or a new DUT, using various tests or irritation scenarios and generates one or more simulation output files. For the cases in which a failure is detected, the simulation environment 202 determines whether a prediction model exists.

For the cases in which the simulation environment 202 determines that a prediction model exists, the fail recognition system 102 retrieves the prediction model from the model store 210 and provides the prediction model to the model predictor 208. In one or more embodiments, the fail recognition system 102 retrieves the prediction model from among the prediction models stored in the model store 210, based on one or more simulation artifacts. For example, if the simulation artifact is a "txt log" of what occurred during the simulation, then a prediction model may be produced based on the "txt log". For the cases in future simulations in which a bug instance occurs, the artifact, for example, a "txt log" file, produced by the bug instance is compared to the appropriate prediction model. In another example, if a simulation outputs an unknown bug instance, the fail recognition system 102 may retrieve a prediction model based on "coverage events triggered during simulation." In one or more embodiments, the fail recognition system 102 retrieves a prediction model based on the simulation and/or bug instance artifact type.

In some embodiments, the model predictor 208 preprocesses the one or more simulation output files to reduce the data set size. The model predictor 208 may pre-process the simulation output file by extracting relevant data that is used to extract tokens present in one or more files in the data set. The model predictor 208 may select the relevant data by selecting the information around and related to the bug instance in the simulation output file. The model predictor 208 may crop out data that is generic and/or unrelated to the bug instance in the file. The model predictor 208 may compute the frequency of occurrence of each token in each file. The frequency may represent the score of the token in each file. In some embodiments, using a set of N text files, the model predictor 208 obtains a D×N matrix containing the scores of all D tokens in all documents. In some embodiments, the model predictor 208 normalizes the tokens of the one or more files in a similar manner discussed with respect to the model trainer 204. In other embodiments, the model predictor 208 may not normalize the tokens of the files.

The model predictor 208 uses the prediction model to predict a bug label of a bug instance generated by a DUT and to provide a confidence score of the predicted bug label, after obtaining the corresponding features and their scores. To predict the bug label, when one or more tokens are extracted from new bug instances and the scores of the new bug instances are computed, the model predictor 208, using the prediction model, applies a learned mathematical scheme on the new bug instances and outputs a bug label for each bug instance. For example, during training the prediction model, some bug instances may belong to bug type "A" and have a zero score for a specific token "T", while other bug instances belong to other bug types and have a nonzero score for token "T". When the model predictor 208 uses the prediction model to predict a bug label for a bug instance, the model predictor 208 may label the bug instance as bug type "A" if the bug instance has a zero score for token "T". In some examples, the model predictor 208 provides a score for each bug label. For example, the model predictor 208 uses the prediction model to provide confidence scores for three bug labels (e.g., 0.8 for bug label A, 0.15 for bug label B, and 0.05 for bug label C) when predicting a bug label for a new bug instance. As bug label A has the highest confidence score, the prediction model predicts bug label A as the label for the bug instance. When predicting a bug label for another new bug instance, the model predictor 208 uses the prediction model to provide confidence scores for three bug labels (e.g., 0.45 for bug label A, 0.35 for bug label B, and 0.25 for bug label C). As bug label A has the highest confidence score, the prediction model predicts bug label A as the label for the bug instance; however, as the score for bug label A for the second bug instance is lower than the score for bug label A in the first instance, the higher score indicates that the prediction model has great confidence in labeling bug label A for the first bug instance.

In some embodiments, the model predictor 208 provides the predicted bug label and confidence score to the feedback unit 212. The feedback unit 212 determines whether the predicted bug label has a high confidence value. For the cases in which the feedback unit 212 determines that the predicted bug label has a low confidence value, the feedback unit 212 provides the predicted bug label to the data store 206 for the design verification engineers to debug and relabel. In one or more embodiments, a predicted bug label having a low confidence value indicates that the bug instance shares one or more characteristics of the predicted bug label; however, the bug instance with a low confidence value is an outlier in the data set.

For the cases in which the feedback unit 212 determines that the predicted bug label has a high confidence value, the feedback unit 212 determines if a fix is available for the bug instance having the predicted bug label. For the cases in which a fix for the predicted bug label is not available, the feedback unit 212 provides the bug instance with the predicted bug label to the queue of bug instances 212a waiting for a fix. In one or more embodiments, the queue of bug instances 212a with predicted bug labels waiting for a fix may be provided to the training data store 206b for incorporation into future training models. In one or more aspects, the queue of bug instances 212a may be a storage repository located on the feedback unit 212. In one or more other aspects, the queue of bug instances 212a may be a storage repository located on the data store 206. For the cases in which a fix for the predicted bug label is available, the feedback unit 212 simulates in the simulation environment 202 the fix with the bug instance having the predicted bug label. For example, if the bug instance is determined to be a bypass that is coming on a cycle too early, the feedback unit 212 simulates a fix by delaying the bypass for a cycle. For the cases in which the feedback unit 212 and/or the simulation environment 202 determines that the fix does not fail and corrects the bug instance, the feedback unit 212 determines that the predicted bug label is correct. In one or more embodiments, the confirmed bug instance may be provided to the training data store 206b for incorporation into future training models. For the cases in which the feedback unit 212 and/or the simulation environment 202 determines that the fix fails and does not correct the bug instance, the feedback unit 212 determines that the predicted bug label is incorrect.

In one or more embodiments, the feedback unit 212 provides the incorrect predicted bug label to the data store 206 for the design verification engineer to debug and relabel. The bug instance having the incorrect predicted bug label is debugged and the type of bug for the bug instance is relabeled. The relabeled and debugged bug instance may be stored in the training data store 206b to be used as training data. The model trainer 204 retrieves the corresponding prediction model from the model store 210 and the relabeled and debugged instance and updates the corresponding prediction model using the relabeled and debugged bug instance.

Figure 3:
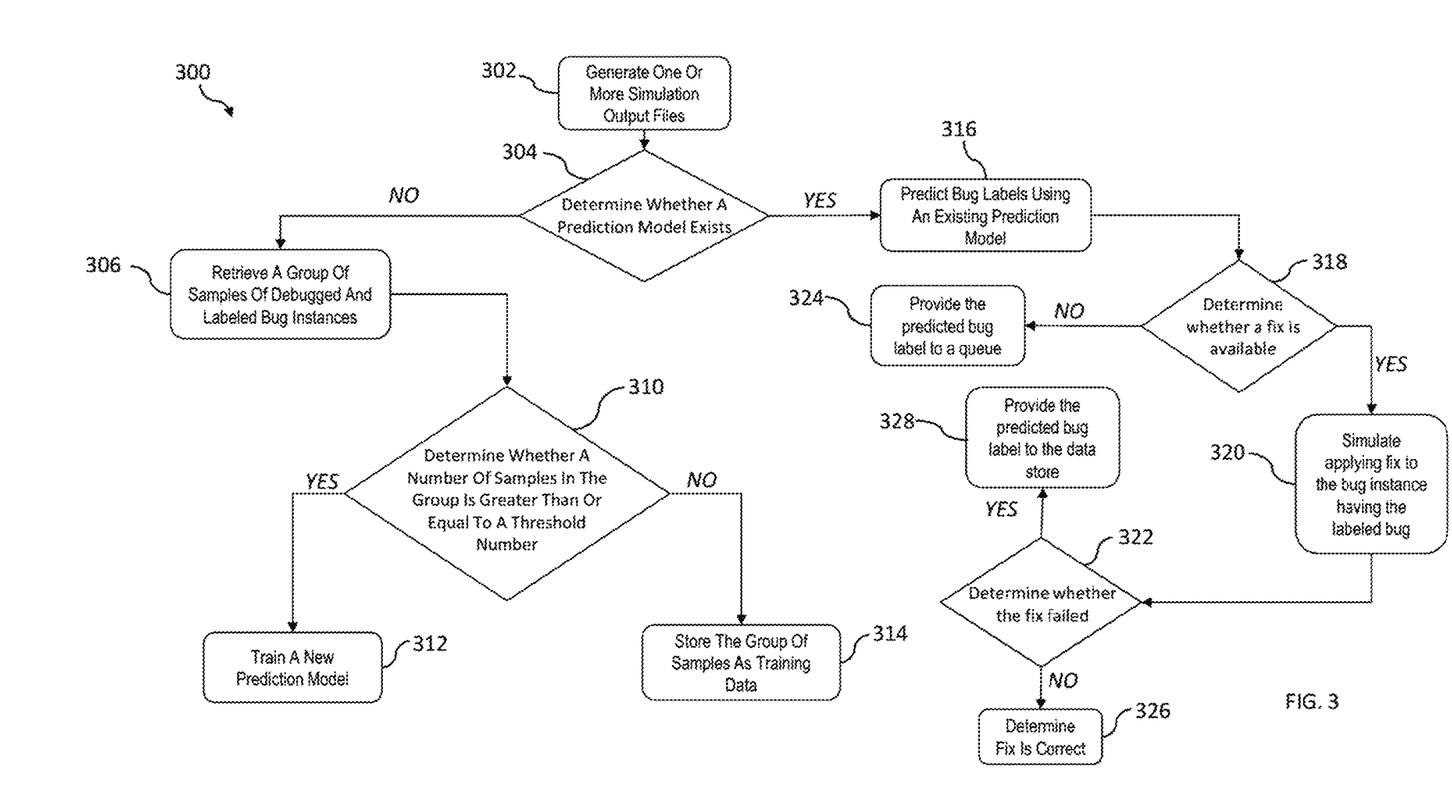
FIG. 3 is a flowchart illustrating a method of identifying design bugs in one or more simulation fails for a processor design, according to one or more embodiments of the present disclosure.

FIG. 3 is an exemplary flowchart illustrating and describing a method 300 for identifying design bugs in one or more simulation fails for a processor design, according to one or more embodiments of the present disclosure. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3, but the process may be integrated and/or one or more steps may be performed together, simultaneously, or the steps may be performed in the order disclosed or in an alternate order.

In one or more embodiments, a request to generate one or more simulation output files is received at 302, the request preferably being received by the simulation environment 202. The simulation environment 202 is configured to simulate a DUT using various tests or irritation scenarios to generate one or more simulation output files, for example a design bug artifact file.

In one or more embodiments, for the cases in which an instance of a failure, i.e., a bug instance, is not detected, the simulation environment 202 discards the simulation output file. In one or more embodiments, in response to detecting a bug instance in the one or more simulation output files, a determination at 304 is made, preferably in some embodiments by the simulation environment 202, as to whether a prediction model exits.

In a case in which the simulation environment 202 determines that a prediction model does not exist (304: NO), the one or more bug instances in the one or more simulation output files are debugged and labeled. In one or more embodiments, the debugged and labeled bug instances are stored in the training data store 206b. In one or more embodiments, a group of samples of the debugged and labeled bug instances are retrieved at 306, preferably by the model trainer 204.

In response to retrieving the group of samples, a determination is made at 310 as to whether a numbers of samples in the group is greater than or equal to a threshold number. For the cases in which the model trainer 204 determines that the number of samples in the group is not greater than or equal to the threshold number (310: NO), the model trainer 204 stores the group of samples as training data at 314. In one or more embodiments, the model trainer 204 stores the group of samples as training data in the training data store 206b. In one or more embodiments, the model trainer 204 uses the training data to retrain or update an established prediction model. For the cases in which the number of samples in the group is greater than or equal to the threshold number (310: YES), the model trainer 204 trains a prediction model at 312.

In one or more embodiments, to train a prediction model, the model trainer 204 optionally pre-processes, as discussed above, one or more simulation output files to reduce the data set size. The model trainer pre-processes the one or more simulation output files by extracting relevant data that is used to extract tokens present in the one or more simulation output files in the data set. In one or more embodiments, the model trainer 204 extracts one or more tokens present in the one or more pre-processed files in the data set. In other embodiments, the model trainer 204 extracts the one or more tokens present in the one or more files in the data set that were not pre-processed. The model trainer 204 may compute the frequency of occurrence of each token in each file. The frequency may represent the score of the token in each file. In some embodiments, using a number (N) of simulation output files, the model trainer 204 obtains a D×N matrix containing the scores of all D tokens in all documents.

The obtained scores matrix may contain tokens with different score ranges, which may result in the predictive model giving more weight to the tokens with higher values. In some embodiments, to avoid the unwanted weighting, the model trainer 204 may adopt a smart weighting scheme such that tokens that are common in most of the files are given less weight compared to those present in a small subset of the files. By normalizing the tokens, the model trainer 204 may search for distinguishing tokens to build a prediction model. The distinguishing tokens may be unique per group and not present across all files. In other embodiments, the model trainer 204 may not use the smart weighting scheme when building certain prediction models.

In some embodiments, with the normalized matrix of scores, the model trainer 204 trains the new prediction model at 312. The model trainer 204 may store the trained prediction model in a model store 210. In some embodiments, the trained prediction model is used to predict a bug label of a bug instance generated by a DUT and to provide the confidence level associated with the prediction of the bug label.

In one or more embodiments, a request to generate one or more other simulation output files is received at 302, the request preferably being received by the simulation environment 202. In one or more embodiments, for the cases in which an instance of a failure is not detected, the simulation environment 202 discards the simulation output file. In one or more embodiments, in response to detecting a failure in the simulation output file, a determination at 304 is made, preferably in some embodiments by the simulation environment 202, as to whether a prediction model exits.

In a case in which the simulation environment 202 determines that a prediction model does exist (304: YES), the model predictor 208 predicts bug labels using an existing prediction model at 316. To predict the bug labels using the existing prediction model, the fail recognition system 102 retrieves the prediction model from the model store 210. The fail recognition system 102 provides the prediction model to the model predictor 208.

Having received the prediction model, the model predictor 208 may pre-process the simulation output file by extracting relevant data that is used to extract tokens present in every file in the data set in a manner as discussed above. In some embodiments, the model predictor 208 may normalize the tokens of the files in a similar manner discussed above. In other embodiments, the model predictor 208 may not normalize the tokens of the files.

In one or more embodiments, the model predictor 208 uses the simulation output files with the prediction model to predict bug labels for bug instances. In one or more embodiments, the model predictor 208 provides a confidence score for the predicted bug label. In one or more embodiments, the model predictor 208 provides the predicted bug label and confidence score to the feedback unit 212 to determine whether the predicted bug label has a high confidence value. For the cases in which the feedback unit 212 determines that the predicted bug label has a low confidence value, the feedback unit 212 provides the predicted bug label to the data store 206 for the design verification engineers to debug and relabel. The debugged and relabeled bug instance is stored in the training data store 206b as training data.

For the cases in which the feedback unit 212 determines that the predicted bug level has a high confidence value, a determination is made at 318, preferably by the feedback unit 212, as to whether a fix is available. For the cases in which the feedback unit 212 determines that a fix is not available for the predicted bug label (318: NO), the feedback unit 212 provides the predicted bug label to a queue at 324. In one or more embodiments, the feedback unit 318 provides the predicted bug label with the corresponding bug instance to the queue of bug instances 212a waiting for a fix. In one or more embodiments, the queue of bug instances 212a with predicted bug labels waiting for a fix may be provided to the training data store 206b for incorporation into future training models. In one or more embodiments, a design verification engineer may retrieve the predicted bug label with the corresponding bug instance and fix the bug instance.

For the cases in which the feedback unit 212 determines that a fix is available for the predicted bug label (318: YES), the feedback unit 212 simulates applying the fix to the bug instance having the labeled bug at 320, preferably in the simulation environment 202. Having simulated the fix for the bug instance, a determination is made at 322, preferably by the feedback unit 212, as to whether the fix failed. For the cases in which the fix does not fail (322: NO), a determination is made at 326 that the fix is correct. For the cases in which the fix does fail (322: YES), the feedback unit 212 determines that the predicted bug label is incorrect, and provides the predicted bug label to the data store 206 at 328. In one or more embodiments, the feedback unit 318 provides the predicted bug label to the data store 206 for a design verification engineer to debug and relabel the type of bug for the bug instance.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 3, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments, a method of debugging one or more simulation fails in processor design verification includes determining whether a prediction model exists. In one or more embodiments, the method includes retrieving, in response to determining the prediction model exists, the prediction model. In some embodiments, the method includes predicting one or more bug labels using the prediction model. In one or more embodiments, the method includes determining whether a fix is available for the one or more predicted bug labels. In one or more embodiments, the method includes simulating, in response to determining the fix is available for the one or more predicted bug labels, the fix for the one or more predicted bug labels.

In one or more embodiments, a computer program product includes a non-transitory computer-readable storage medium having program instructions embodied therewith for debugging one or more simulation fails in processor design verification, the program instructions executable by one or more processors. The program instructions in an embodiment includes determining whether a prediction model exists. The program instructions include retrieving, in response to determining the prediction model exists, the prediction model. The program instructions in an embodiment include predicting one or more bug labels using the prediction model. The program instructions in an embodiment include determining whether a fix is available for the one or more predicted bug labels. The program instructions in an embodiment include simulating, in response to determining the fix is available for the one or more predicted bug labels, the fix for the one or more predicted bug labels.

In one or more embodiments, a fail recognition apparatus for debugging one or more simulation fails in processor design verification including memory having program instructions embodied therewith, and at least one processor. In one or more embodiments, the at least one processor is configured to read the program instructions to execute a simulation environment configured to determine whether a prediction model exists. In one or more embodiments, the at least one processor is configured to read the program instructions to execute a model predictor configured to, in response to determining the prediction model exists, retrieve the prediction model and predict one or more bug labels using the prediction model. In one or more embodiments, the at least one processor is configured to read the program instructions to execute a feedback unit configured to determine whether a fix is available for the one or more predicted bug labels, and simulate, in response to determining the fix is available for the one or more predicted bug labels, the fix for the one or more predicted bug labels.

One or more embodiments of the present disclosure may be an apparatus, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of debugging one or more simulation fails in processor design verification, the method comprising:
    determining whether a prediction model to predict one or more bug labels for the one or more simulation fails in a processor design exists;
    retrieving, in response to determining the prediction model exists, the prediction model;
    predicting one or more bug labels for the one or more simulation fails in the processor design using the prediction model;
    determining whether a fix is available for the one or more predicted bug labels; and
    simulating, in response to determining the fix is available for the one or more predicted bug labels, the fix for the one or more predicted bug labels in the processor design.

2. The method of claim 1, further comprising:
    determining whether the fix for the one or more predicted bug labels failed; and
    providing, in response to determining that the fix for the one or more predicted bug labels failed, the one or more predicted bug labels for review.

3. The method of claim 1, further comprising providing, in response to determining the fix is not available for the one or more predicted bug labels, the one or more predicted bug labels to a queue for processing in a training data store.

4. The method of claim 1, further comprising:
    retrieving, in response to determining the prediction model does not exist, a group of debugged and labeled bug instances, and
    determining whether a number of labeled bug instances in the group is greater than or equal to a threshold number.

5. The method of claim 4, further comprising storing, in response to determining that the number of labeled bug instances in the group is not greater than or equal to the threshold number, the group of debugged and labeled bug instances in storage as training data.

6. The method of claim 4, further comprising training the prediction model based on automated pre-processing and feature extraction.

7. The method of claim 4, further comprising training, in response to determining that the number of labeled bug instances in the group is greater than or equal to the threshold number, the prediction model.

8. The method of claim 1, wherein predicting one or more bug labels using the prediction model further comprises extracting features of a simulation file related to one or more bug instances of the simulation file and predicting one or more bug labels of one or more bug instances in the simulation file.

9. A computer program product comprising:
    a non-transitory computer-readable storage medium having program instructions embodied therewith for debugging one or more simulation fails in processor design verification, the program instructions executable by one or more processors, the program instructions including:
        determining whether a prediction model to predict one or more bug labels for the one or more simulation fails in a processor design exists;
        retrieving, in response to determining the prediction model exists, the prediction model;

predicting one or more bug labels for the one or more simulation fails in the processor design using the prediction model;

determining whether a fix is available for the one or more predicted bug labels; and simulating, in response to determining the fix is available for the one or more predicted bug labels, the fix for the one or more predicted bug labels in the processor design.

10. The computer program product of claim 9, wherein the program instructions further include:

determining whether the fix for the one or more predicted bug labels failed; and providing, in response to determining that the fix for the one or more predicted bug labels failed, the one or more predicted bug labels for review.

11. The computer program product of claim 9, wherein the program instructions further include providing, in response to determining the fix is not available for the one or more predicted bug labels, the one or more predicted bug labels to a queue for processing in a training data store.

12. The computer program product of claim 10, wherein the program instructions further include determining whether a number of labeled bug instances in the group is greater than or equal to a threshold number.

13. The computer program product of claim 12, wherein the program instructions further include storing, in response to determining that the number of labeled bug instances in the group is not greater than or equal to the threshold number, the group of debugged and labeled bug instances in storage as training data.

14. The computer program product of claim 12, wherein the program instructions further include training, in response to determining that the number of labeled bug instances in the group is greater than or equal to the threshold number, the prediction model.

15. A fail recognition apparatus for debugging one or more simulation fails in processor design verification, the fail recognition apparatus comprising:

memory having program instructions embodied therewith, and at least one processor configured to read the program instructions to execute:

a simulation environment configured to determine whether a prediction model to predict one or more bug labels for the one or more simulation fails in a processor exists;

a model predictor configured to, in response to determining the prediction model exists, retrieve the prediction model and predict one or more bug labels for the one or more simulation fails in the processor design using the prediction model; and a feedback unit configured to determine whether a fix is available for the one or more predicted bug labels, and simulate, in response to determining the fix is available for the one or more predicted bug labels, the fix for the one or more predicted bug labels in the processor design.

16. The fail recognition apparatus of claim 15, wherein the feedback unit is further configured to determine whether the fix for the one or more predicted bug labels failed, and to provide in response to determining that the fix for the one or more predicted bug labels failed, the one or more predicted bug labels for review.

17. The fail recognition apparatus of claim 15, further comprising a model trainer configured to receive, in response to determining the prediction model does not exist, a group of debugged and labeled bug instances.

18. The fail recognition apparatus of claim 17, wherein the model trainer is further configured to determine whether a number of labeled bug instances in the group is greater than or equal to a threshold number.

19. The fail recognition apparatus of claim 18, wherein the model trainer is further configured to store, in response to determining that the number of labeled bug instances in the group is not greater than or equal to the threshold number, the group of debugged and labeled bug instances in storage as training data.

20. The fail recognition apparatus of claim 17, wherein the model trainer is further configured to train, in response to determining that the number of labeled bug instances in the group is greater than or equal to the threshold number, the prediction model.

* * * * *